C. M. POWERS.
Beer-Strainers.
No. 139,971.                   Patented June 17, 1873.
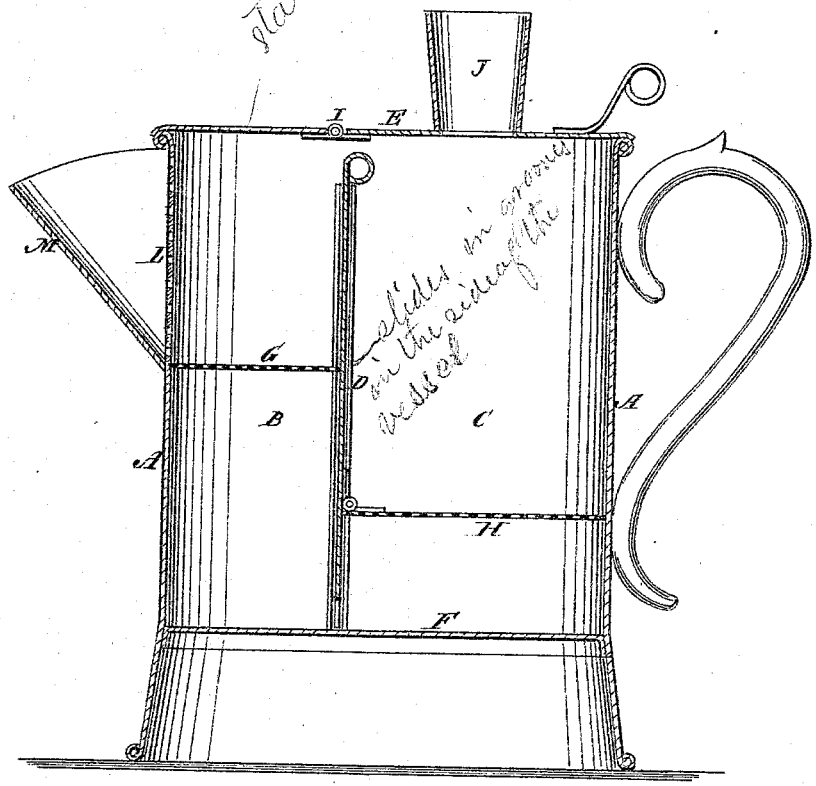
Witnesses:
Inventor:
C. M. Powers
Per
Attorneys.

UNITED STATES PATENT OFFICE.

CHARLES M. POWERS, OF RIDGEWOOD, NEW JERSEY.

IMPROVEMENT IN BEER-STRAINERS.

Specification forming part of Letters Patent No. 139,971, dated June 17, 1873; application filed March 8, 1873.

*To all whom it may concern:*

Be it known that I, CHARLES M. POWERS, of Ridgewood, in the county of Bergen and State of New Jersey, have invented a new and useful Improvement in Beer-Strainer, of which the following is a specification:

The invention consists in providing the strainer with a removable partition, having a removable straining-plate attached thereto, as hereinafter described.

The drawing represents a vertical central section of a beer-strainer made according to my invention.

Similar letters of reference indicate corresponding parts.

A is a vessel similar in form to an ordinary beer-tankard, divided into two compartments, B and C, by the vertical sliding partition D. This partition slides in grooves on the sides of the vessel, and extends from near the cover E to near the bottom F, as seen in the drawing. G is a horizontal stationary strainer in the compartment B. H is a strainer in the compartment C which is hinged to the vertical portion D. This strainer is hinged to the partition so that it can be withdrawn with the partition for cleaning, when necessary. The cover is made in two parts, one part being stationary, to which the other part is hinged as seen at I.

The beer to be strained is introduced into the part C through the opening J, and passes through the strainer H, and finds its way into the compartment B through the opening K beneath the partition D. It then ascends and passes through the strainer G, and through the perforated side L of the vessel A, and is discharged from the spout M clear and free from froth.

The partition D is made of sheet tin or other suitable material. The strainers may be made of either perforated metal, wire-gauze, or of suitable textile fabric, supported in any other manner.

Having thus described my invention, I claim as new, and desire to secure by Letters Patent—

A beer-strainer having a removable partition, with a removable strainer attached thereto, as shown and described.

CHARLES M. POWERS.

Witnesses:
 T. B. MOSHER,
 ALEX. F. ROBERTS.